US012670795B2

(12) United States Patent
Yamaoka

(10) Patent No.: US 12,670,795 B2
(45) Date of Patent: Jun. 30, 2026

(54) MONITORING DEVICE

(71) Applicant: TOYOTA JIDOSHA KABUSHIKI KAISHA, Toyota (JP)

(72) Inventor: Masaaki Yamaoka, Meguro-ku (JP)

(73) Assignee: TOYOTA JIDOSHA KABUSHIKI KAISHA, oyota (JP)

( * ) Notice: Subject to any disclaimer, the term of this patent is extended or adjusted under 35 U.S.C. 154(b) by 0 days.

(21) Appl. No.: 19/017,978

(22) Filed: Jan. 13, 2025

(65) Prior Publication Data

US 2025/0239162 A1 Jul. 24, 2025

(30) Foreign Application Priority Data

Jan. 18, 2024 (JP) ................................ 2024-005949

(51) Int. Cl.
*G08G 1/16* (2006.01)

(52) U.S. Cl.
CPC .................................. *G08G 1/166* (2013.01)

(58) Field of Classification Search
CPC ...................................................... G08G 1/166
See application file for complete search history.

(56) References Cited

U.S. PATENT DOCUMENTS

2016/0121791 A1* 5/2016 Shimizu ................. B60Q 1/525
340/435

FOREIGN PATENT DOCUMENTS

JP 2014-059841 A 4/2014
JP 2017-174449 A 9/2017
JP 2022-080360 A 5/2022

* cited by examiner

*Primary Examiner* — Steven Lim
*Assistant Examiner* — James E Munion
(74) *Attorney, Agent, or Firm* — Dinsmore & Shohl LLP

(57) ABSTRACT

A monitoring device has a processor configured to determine whether a first moving object and a second moving object in a predetermined area around a host vehicle are present, set a first detection area for the first moving object and a second detection area for the second moving object, determine whether an obstacle which interrupts detection of the second moving object in the first detection area and interrupts detection of the first moving object in the second detection area is present, determine whether the first and second moving objects will approach to a predetermined reference distance in a state where detection of the second moving object in the first detection area is interrupted by the obstacle and detection of the first moving object in the second detection area is interrupted by the obstacle, and decide to notify the first and the second moving object of a warning.

2 Claims, 6 Drawing Sheets

MONITORING DEVICE

CROSS-REFERENCE TO RELATED APPLICATIONS

This application claims priority to Japanese Patent Application No. 2024-005949 filed Jan. 18, 2024, the entire contents of which are herein incorporated by reference.

FIELD

The present disclosure relates to a monitoring device.

BACKGROUND

An automatic control device for controlling a vehicle controls the vehicle to maintain a safe distance between the vehicle and another vehicle using a sensor to detect other vehicles. Thus, the vehicle is prevented from approaching another vehicle (e.g., see Japanese Unexamined Patent Publication No. 2017-174449).

When there is a high structure around the vehicle, the detection range of the sensor will be interrupted by the structure, resulting in an area that cannot be detected by the sensor. When another vehicle is in an area where another vehicle cannot be detected by the sensor of the vehicle, the sensor cannot detect another vehicle.

There can occur a case where two vehicles are located in an area where they cannot detect each other by the sensors although the two vehicles are approaching each other. For example, in a case where a host vehicle is in front of an intersection without a traffic light, and there is an oncoming vehicle that is trying to turn right at this intersection in front of the host vehicle. Further, from the direction in which the oncoming vehicle turns right, another vehicle is traveling in an attempt to go straight through the intersection (e.g., see FIG. 1). Here, when the high structure is located between the oncoming vehicle and another vehicle, the two vehicles are located in an area where they cannot detect each other by the sensors.

The two vehicles cannot detect each other because they are located in the area where they cannot be detected by the sensors as they approach the intersection.

After the oncoming vehicle and another vehicle enter the intersection, the two vehicles can detect each other because the structure has disappeared. However, at this point, the two vehicles are much closer together.

SUMMARY

On the other hand, since the oncoming vehicle and another vehicle are in the detection area of the sensor of the host vehicle, the host vehicle can detect that the oncoming vehicle and another vehicle are approaching each other.

It is an object of the present disclosure to provide a monitoring device that notifies the two moving objects that they are approaching before they get too close to each other when the monitoring device detects that two moving objects are approaching each other.

(1) According to one embodiment, a monitoring device is provided. This monitoring device has a processor configured to determine whether a first moving object and a second moving object are present in a predetermined area around a host vehicle, set a first detection area for detecting another moving object with respect to the first moving object and a second detection area for detecting another moving object with respect to the second moving object, when it has been determined that the first moving object and the second moving object are present, determine whether an obstacle which interrupts detection of the second moving object included in the first detection area and interrupts detection of the first moving object included in the second detection area is present, when the first detection area and the second detection area have been set, determine whether the first moving object and the second moving object will approach to a predetermined reference distance in a state where detection of the second moving object in the first detection area is interrupted by the obstacle and detection of the first moving object in the second detection area is interrupted by the obstacle, when it has been determined that the obstacle is present, and decide to notify the first moving object and the second moving object of a warning, when it has been determined that the first moving object and the second moving object will approach to the reference distance.

(2) In the monitoring device of embodiment (1) above, the processor is further configured to set the reference distance based on a positional relationship of the first moving object and the second moving object with respect to the host vehicle.

(3) In the monitoring device of embodiment (2) above, the processor is further configured to set the reference distance to be shorter when the first moving object and the second moving object are on the same side with respect to the host vehicle than when the first moving object and the second moving object are on different sides with respect to the host vehicle.

(4) In the monitoring device of embodiment (1) above, the processor is further configured to set the reference distance based on speed of the first moving object and the second moving object.

(5) In the monitoring device of embodiment (4) above, the processor is further configured to set the reference distance to be longer when the speed of one of the first moving object and the speed of the second moving object exceeds a predetermined reference speed than when the speed of the first moving object and the speed of the second moving object does not exceed the reference speed.

The monitoring device according to the present disclosure, can notify two moving objects that they are approaching before they get too close to each other when the monitoring device detects that two moving objects are approaching each other.

The object and advantages of the present disclosure will be realized and attained by the elements and combinations particularly specified in the claims. It is to be understood that both the foregoing general description and the following detailed description are exemplary and explanatory, and are not restrictive of the present disclosure, as claimed

DESCRIPTION OF EMBODIMENTS

Figure 1:
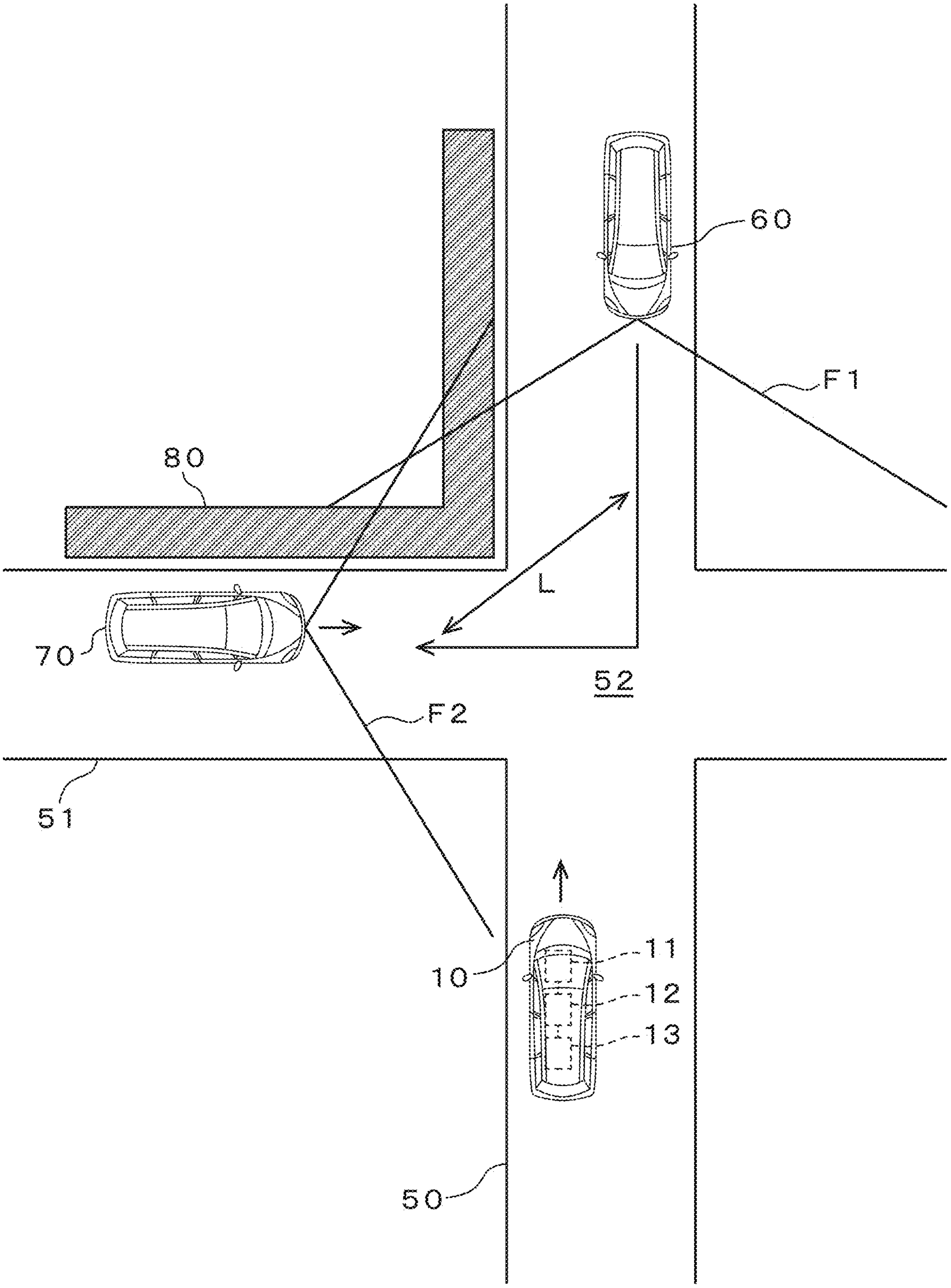
FIG. 1 is a diagram illustrating operation of a monitoring device according to a present embodiment in overview.

FIG. 1 is a diagram illustrating operation of a monitoring device 13 according to a present embodiment in overview. Operation related to monitoring processing of the monitoring device 13 of the present embodiment will be explained in overview with reference to FIG. 1.

As shown in FIG. 1, a vehicle 10 is traveling on a road 50. The road 50 intersects a road 51 at an intersection 52. The vehicle 10 is located in front of the intersection 52. The vehicle 10 is an exemplary a host vehicle.

The vehicle 10 includes an object detecting device 11, an automatic control device 12, and a monitoring device 13. The object detecting device 11 generates object detection information representing an object such as a vehicle based on environmental information representing the environment around the vehicle 10 such as a camera image. The object detecting device 11 also generates road feature information representing a road feature such as a lane marking line based on the environmental information. The automatic control device 12 controls the vehicle 10 based on the object detection information and road feature information, etc. The vehicle 10 may be an autonomous vehicle.

When the monitoring device 13 detects that two moving objects are approaching each other, the monitoring device 13 determines to notify the two moving objects that they are approaching before they approach each other too closely.

The monitoring device 13 determines that the vehicle 60 and vehicle 70 are present in a predetermined area around the vehicle 10 based on the object detection information. The vehicle 60 is traveling on the road 50 on the opposite side of the vehicle 10 with respect to the intersection 52 and will turn right at the intersection 52. The vehicle 70 is traveling on the road 51 to the left of intersection 52 and is scheduled to go straight ahead at the intersection 52.

The monitoring device 13 sets a first detection area F1 for detecting another moving object with respect to the vehicle 60 and sets a second detection area F2 for detecting another moving object with respect to the vehicle 70. The first detection area F1 may be a detection area of a camera.

The first detection area F1, for example, can be a detection area of a sensor such as a camera virtually disposed in front of the vehicle 60. Similarly, the second detection area F2, for example, can be a detection area of a sensor such as a camera virtually disposed in front of the vehicle 70.

The monitoring device 13 determines that there is a structure 80 as an obstacle that may interrupt detection of the second moving object included in the first detection area F1 and that may interrupt detection of the first moving object included in the second detection area F2. The structure 80 is arranged in an L-shape at the upper left of the intersection 52. The structure 80 extends upwardly along the road 50 after extending along the road 51 up to the intersection 52 on the left side of the intersection 52. The height of the structure 80 is about 3 m.

The structure 80 is blocking a portion of the right side of the first detection area F1, and the vehicle 70 is not detected from the vehicle 60. Similarly, the structure 80 is blocking a portion of the left side of the second detection area F2, and the vehicle 60 is not detected from the vehicle 70. It is therefore possible for the vehicle 60 and vehicle 70 to approach each other when they are travelling as they are.

The monitoring device 13 decides to notify the vehicle 60 and vehicle 70 of a warning since the monitoring device 13 determines that the vehicle 60 and vehicle 70 will approach to a reference distance L in a state where the detection of the vehicle 70 in the first detection area F1 is interrupted by the structure 80 and the detection of the vehicle 60 in the second detection area F2 is interrupted by the structure 80. The reference distance L is set, for example, as the distance at which the vehicle 60 and vehicle 70, of which the warning is notified by the vehicle 10, can safely stop to avoid a collision.

The automatic control device 12 notifies the vehicle 60 and vehicle 70 of the warning. The vehicle 60 and vehicle 70, which were alerted by the automatic control device 12, stopped after deceleration.

As described above, the monitoring device 13 can notify the two vehicles 60, 70 that they are approaching each other before they get too close when the monitoring device 13 detects that the two vehicles 60, 70 are approaching each other. Since the two vehicles 60, 70 can stop at a safe stopping distance, the monitoring device 13 can prevent the two vehicles 60, 70 from approaching each other.

Figure 2:
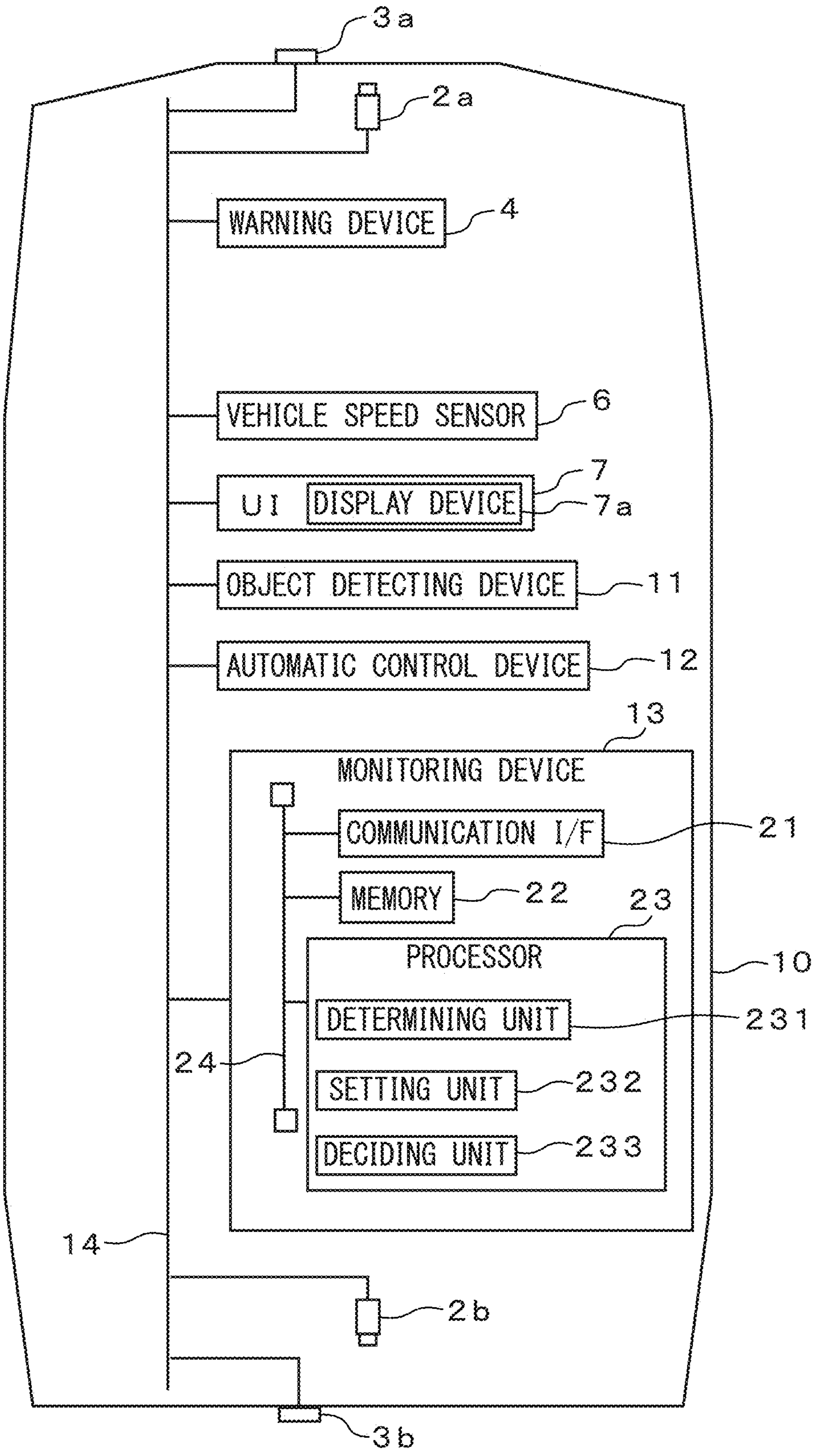
FIG. 2 is a hardware configuration diagram for a vehicle in which the monitoring device of the present embodiment is mounted.

FIG. 2 is a hardware configuration diagram for the vehicle 10 in which the monitoring device 13 of the present embodiment is mounted. The vehicle 10 has a front camera 2*a*, a rear camera 2*b*, a LiDAR sensors 3*a*, 3*b*, a warning device 4, a vehicle speed sensor 6, a user interface (UI) 7, an object detecting device 11, an automatic control device 12, and a monitoring device 13, etc.

The front camera 2*a*, the rear camera 2*b*, the LiDAR sensors 3*a*, 3*b*, the warning device 4, the vehicle speed sensor 6, the UI 7, the object detecting device 11, the automatic control device 12, and the monitoring device 13 are communicatively connected via an in-vehicle network 14 conforming to standard such as a controller area network.

Each of the front camera 2*a* and rear camera 2*b* is an exemplary image capturing device provided in the vehicle 10. The front camera 2*a* is mounted to the vehicle 10 so as to face the front of the vehicle 10. The rear camera 2*b* is mounted to the vehicle 10 so as to face the rear of the vehicle 10.

Each of the front camera 2*a* and rear camera 2*b*, for example, captures camera images representing the environment of the area within the predetermined field of view of the front or rear of the vehicle 10 at a camera image acquisition time set with a predetermined cycle. The camera image may represent road contained within predetermined area in front or rear of the vehicle 10 and road features such as lane marking line on the road surface thereof. Each of the front camera 2*a* and the rear camera 2*b* has a two-dimensional detector composed of an array of photoelectric conversion elements sensitive to visible light, such as CCD or CMOS. Further, each of the front camera 2*a* and the rear camera 2*b* has an imaging optical system that forms an image of the captured region on the two-dimensional detector. The field of view of the front camera 2*a* and the rear camera 2*b* is one example of a predetermined area around the vehicle 10.

Each of the front camera 2*a* and the rear camera 2*b* outputs the camera image and the camera image acquisition time to the object detecting device 11 etc. through the in-vehicle network 14 each time the camera image is captured. The camera image is used in the object detecting device 11 to detect objects and road features around the vehicle 10.

The LiDAR sensor 3*a* is, for example, mounted on the outer surface of the vehicle 10 so as to face the front of the vehicle 10. The LiDAR sensor 3*b* is, for example, mounted on the outer surface of the vehicle 10 so as to face the rear of the vehicle 10.

Each of the LiDAR sensors 3*a*, 3*b* emits a scanning laser toward the predetermined visual field in front of or behind the vehicle 10, at a reflected wave information acquisition time set with a predetermined cycle. Then, each of the LiDAR sensors 3*a*, 3*b* receives a reflected wave that has been reflected from a reflector. The time required for the reflected wave to return contains information for the distance between the vehicle 10 and object located in the direction in which the laser has been emitted. The LiDAR sensors 3*a*, 3*b* output the reflected wave information together with the reflected wave information acquisition time, through the in-vehicle network 14 to the object detecting device 11. The reflected wave information includes the laser emission direction and the time required for the reflected wave to return. The reflected wave information acquisition time represents the time when the laser was emitted. At the object detecting device 11, the reflected wave information is used in processing for detecting objects around the vehicle 10. In some embodiments, the field of view of the LiDAR sensors 3*a*, 3*b* overlaps the field of view of the front camera 2*a* and rear camera 2*b*.

The warning device 4 is controlled by the monitoring device 13, etc. and can output sound. The warning device 4 has, for example, an amplifier for outputting a warning signal and a speaker for outputting a warning signal from the amplifier as a warning sound. In some embodiments, the speakers are disposed in each of the front and rear of the vehicle 10. In some embodiments, the warning sound reaches across the field of view of the front camera 2*a* and the rear camera 2*b*. Further, a headlight (not shown) may be used as the warning device 4.

The vehicle speed sensor 6 detects speed information representing the speed of the vehicle 10. The vehicle speed sensor 6 includes, for example, a measuring device that measures the rotational speed of the tire of the vehicle 10. The vehicle speed sensor 6 outputs the speed information to the object detecting device 11, the automatic control device 12, and the monitoring device 13, etc. through the in-vehicle network 14. The speed information is used in processing for determining the speed of the vehicle 10 in the object detecting device 11, the automatic control device 12, and the monitoring device 13.

The UI 7 is an exemplary notification device. The UI 7 is controlled by the automatic control device 12, the monitoring device 13, etc. to notify the driver of the traveling information and warning of the vehicle 10. The traveling information of the vehicle 10 includes the current position of the vehicle 10, notification to the driver, and the like. The UI 7 has a display device 7*a* such as a liquid crystal display or a touch panel in order to display traveling information etc. The UI 7 may also have a sound-output device (not shown) for notifying the driver of traveling information, warning and the like.

The object detecting device 11 detects an object around the vehicle 10 and its type based on the camera image. An Object includes moving object such as a pedestrian and vehicle. A vehicle includes a bicycle, two-wheeled vehicle, and four-wheeled vehicle. The object also contains a structure that can interrupt the detection of another moving object within the detection range set for the moving object and become an obstacle. A structure includes a wall and building.

Further, the object detecting device 11 detects road features such as a lane marking line and a traffic light based on the camera image. The object detecting device 11 may detect the lighting state of the traffic light. The object detecting device 11 may also detect a road edge.

The object detecting device 11 includes, for example, a classifier that detects an object, a structure, and a road feature represented in an image by inputting a camera image. As the classifier, for example, a deep neural network (DNN) trained in advance to detect an object, a structural object, and a road feature represented in the image from the input image can be used. The object detecting device 11 may use a classifier other than DNN.

The object detecting device 11 may also detect an object around the vehicle 10 based on the reflected wave information. The object detecting device 11 may determine the orientation of the object with respect to the vehicle 10 based on the position of the object in the camera image, and also obtain the distance between the object and the vehicle 10 based on this orientation and the reflected wave information. The position of an object represents a position representative of the object (e.g., the center of gravity). The object detecting device 11 estimates the position of an object, for example, represented in a vehicle coordinate system, based on the current position of the vehicle 10 and the distance and orientation to the object relative to the vehicle 10. The object detecting device 11 may also track an object detected from the latest image by associating the object detected from the latest camera image with the object detected from the past image according to the tracking process based on the optical flow. The tracked object is given an object identification number. Then, the object detecting device 11 may obtain the trajectory of the object being tracked based on the position of the object in the latest image from the past image. The object detecting device 11 can estimate the speed of the object with respect to the vehicle 10 based on changes in the position of the object with time. Further, the object detecting device 11 can estimate the acceleration of the object based on the change in the speed of the object with time. The object detecting device 11 may determine the position of the road feature in the same manner as described above. The position of a road feature is represented, for example, by a vehicle coordinate system.

Further, the object detecting device 11 determines the height of an object detected as a structure, based on the reflected wave information. When the height of the object exceeds a predetermined reference height, the object detecting device 11 determines this structure as an obstacle. As the reference height, for example, it can be 1.0 m to 1.5 m. A structure above the reference height will block part of the driver's field of view and the camera's field of view. The object detecting device 11 generates obstacle information representing the position of the obstacle. The object detecting device 11 also determines a stationary vehicle with a height equal to or greater than the reference height as an obstacle. The object detecting device 11 determines a vehicle having a speed of zero as a stationary vehicle.

The object detecting device 11 notifies the automatic control device 12, and the monitoring device 13, etc. of the object detection information including information representing an object and road feature information representing a road feature. The object detection information includes information indicating the type of the detected object and information indicating the position, the speed, the acceleration, and the traveling lane. For tracked objects, the object detection information includes an object identification number. The road feature information may include the position of the traffic light and the lighting state of the traffic light.

Further, the object detecting device 11 outputs the obstacle information to the monitoring device 13 through the in-vehicle network 14.

The automatic control device 12 controls the operation of the vehicle 10. The automatic control device 12 includes an automatic operation mode for driving the vehicle 10 in automatic operation and a manual operation mode for controlling the operation of the vehicle 10 based on the operation of the driver. In the automatic operation mode, the automatic control device 12 mainly drives the vehicle 10. In the automatic operation mode, the automatic control device 12 controls operation such as steering, driving, and braking based on the object detection information, and road feature information, etc.

In the manual operation mode, the driver mainly drives the vehicle 10. In the manual operation mode, the automatic control device 12 controls the operation of the vehicle 10 such as steering, driving, braking, and the like based on operation to the control section of the driver. The automatic control device 12, in the manual operation mode, controls the operation of the vehicle 10 based on the operation of at least one of the steering wheel, brake pedal or accelerator pedal (not shown) by the driver.

The automatic control device 12 outputs a steering signal for controlling steering to a steering device (not shown) through the in-vehicle network 14. The automatic control device 12 outputs a drive signal for controlling a drive device (not shown) through the in-vehicle network 14. The automatic control device 12 outputs a braking signal for controlling braking to a braking device (not shown) through the in-vehicle network 14.

The monitoring device 13 carries out determination processing, setting processing, and a deciding processing. For this purpose, the monitoring device 13 has a communication interface (IF) 21, a memory 22 and a processor 23. The communication interface 21, memory 22 and processor 23 are connected via signal wires 24. The communication interface 21 has an interface circuit to connect the monitoring device 12 with the in-vehicle network 14.

The memory 22 is an exemplary a memory unit, and it has a volatile semiconductor memory and a non-volatile semiconductor memory, for example. The memory 22 stores an application computer program and various data to be used for information processing carried out by the processor 23 of each device.

All or some of the functions of the monitoring device 13 are functional modules driven by a computer program operating on the processor 23, for example. The processor 23 has a determining unit 231, a setting unit 232, and a deciding unit 233. Alternatively, the functional module of the processor 23 may be a specialized computing circuit in the processor 23. The processor 23 has one or more CPUs (Central Processing Units) and their peripheral circuits. The processor 23 may also have other computing circuits such as a logical operation unit, numerical calculation unit or graphics processing unit.

Figure 3:
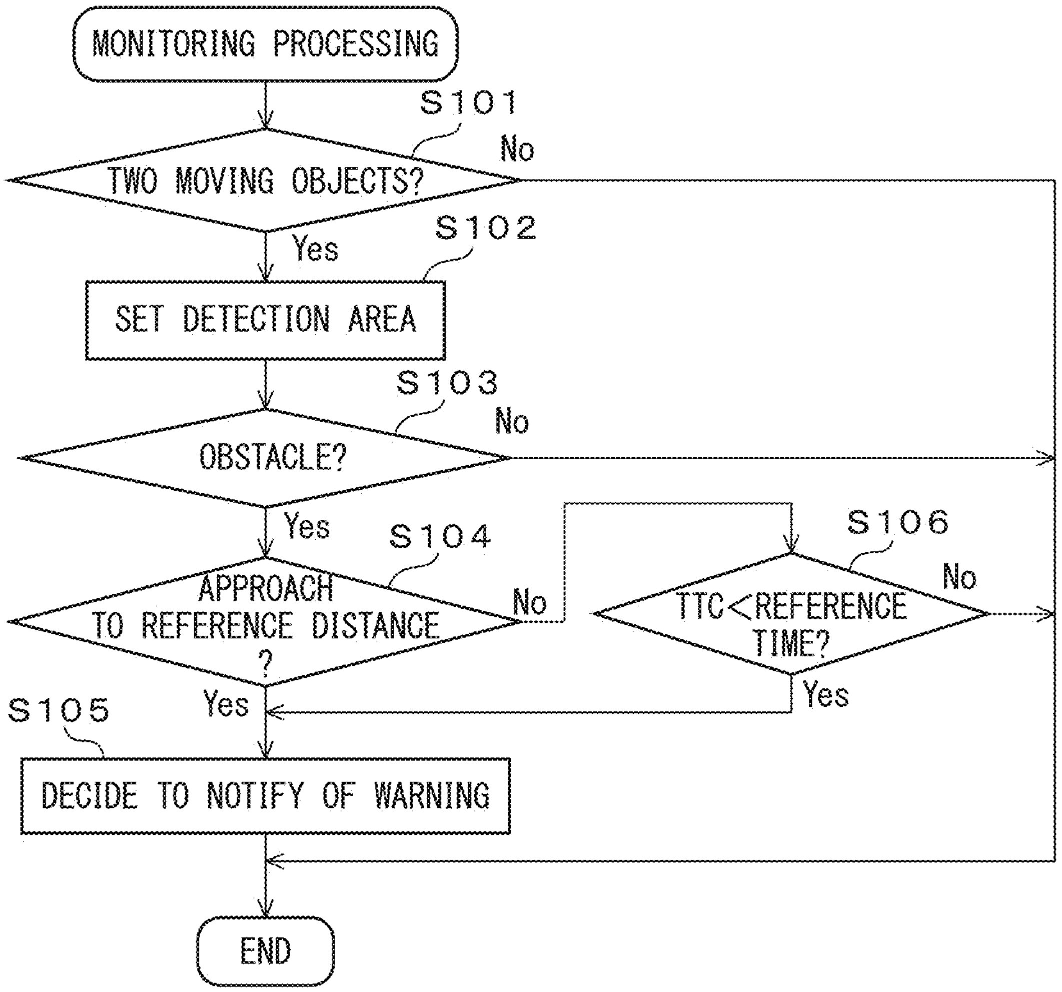
FIG. 3 is an example of an operation flow chart for monitoring processing by a monitoring device of the present embodiment.

FIG. 3 is an example of an operation flow chart for monitoring processing by a monitoring device 13 of the present embodiment. Referring to FIG. 3, monitoring processing of the monitoring device 13 will be explained below. The monitoring device 13 carries out monitoring processing in accordance with the operation flowchart shown in FIG. 3 at the monitoring time set at a predetermined period.

First, the determining unit 231 determines whether a first moving object and a second moving object are present in a predetermined area around the vehicle 10 (step S101). The determining unit 231 is an example of a first determining unit. The determining unit 231 determines that two moving objects are present, when two moving objects are detected based on the object detection information. A moving object includes a two-wheeled vehicle, four-wheeled vehicle, pedestrian, and bicycle.

Next, when it has been determined that the first moving object and the second moving object are present (step S101—Yes), the setting unit 232 sets a first detection area for detecting another moving object with respect to the first moving object and sets a second detection area for detecting another moving object with respect to the second moving object (step S102).

Figure 4:
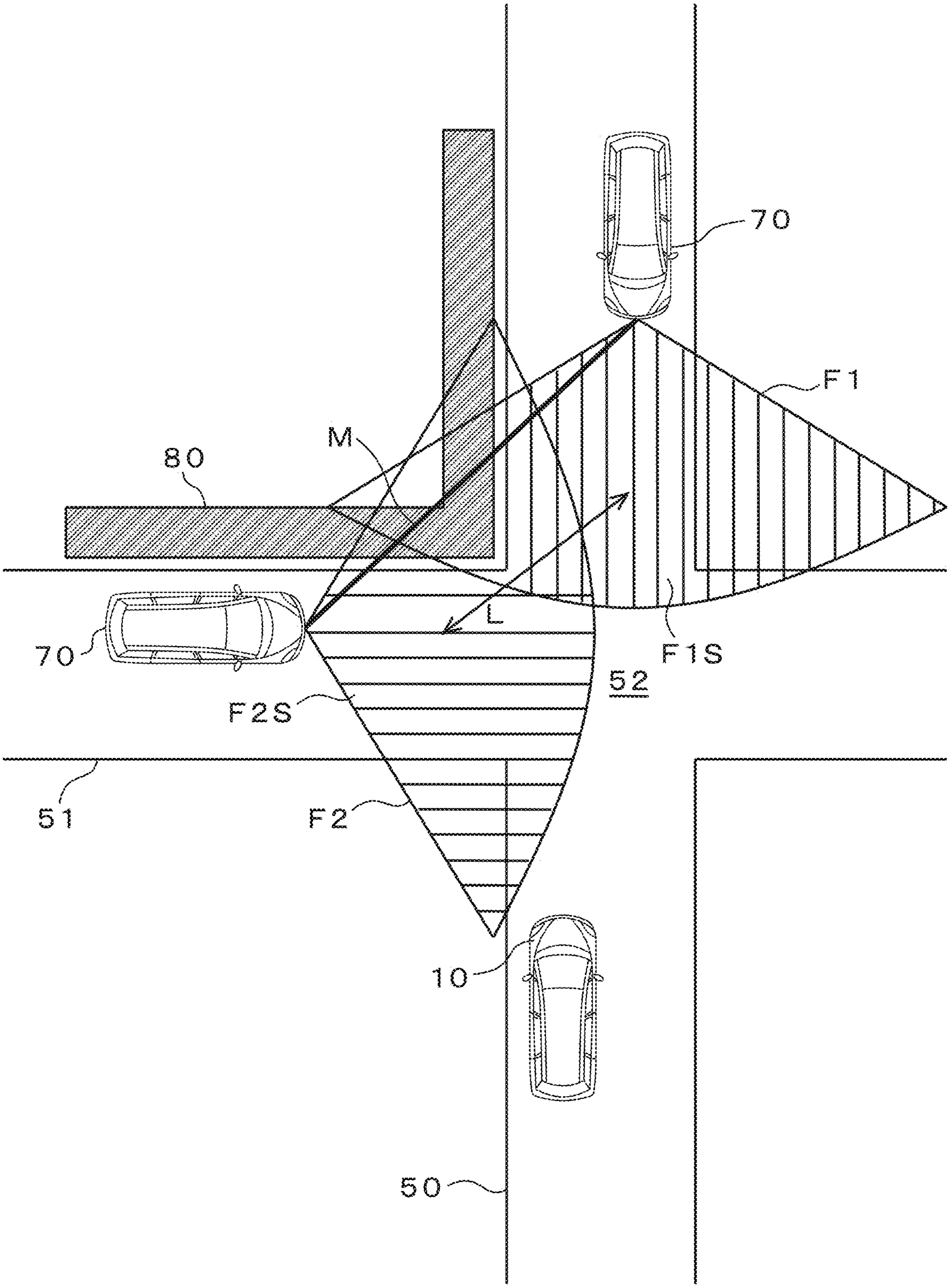
FIG. 4 is a diagram for explaining the first detection area and the second detection area.

FIG. 4 is a diagram for explaining the first detection area and second detection area. The setting unit 232 virtually places a first sensor in the center of the front of the vehicle 60. The first detection area F1 is set for the first sensor. Similarly, the setting unit 232 virtually places a second sensor in the center of the front of the vehicle 70. The second detection area F2 is set for the second sensor. For example, the first detection area F1 and second detection area F2 can be 150 degrees to the left and right as the field of view and 200 meters as the detection distance. The first detection area F1 and second detection area F2 move together with the movement of the first moving object and the second moving object.

Next, the determining unit 231 determines whether an obstacle that may interrupt detection of the second moving object included in the first detection area and that may interrupt detection of the first moving object included in the second detection area is present (step S103). The determining unit 231 is an example of a second determination unit. The determining unit 231 obtains the position of the obstacle based on the obstacle information. The determining unit 231 determines that an obstacle that may interrupt detection is present when a straight line connecting the position of the first moving object and the position of the second moving object intersects with an area where the obstacle is located. The method of determining whether an obstacle is present is not limited thereto.

In the example shown in FIG. 4, a straight line M connecting the center of the front of the vehicle 60 and the center of the front of the vehicle 70 intersects with the obstacle 80.

The presence or absence of obstacle that interrupts the detection of moving object may vary with the positions of the two moving objects. Therefore, the monitoring processing is carried out at each monitoring time to determine the relationship between their locations.

On the other hand, when the straight line connecting the position of the first moving object and the position of the second moving object does not intersect with the area where the obstacle is located, the determining unit 231 determines that there is no obstacle. In addition, when no obstacle information is notified, the determining unit 231 determines that there is no obstacle.

When an obstacle is present (step S103—Yes), the determining unit 231 determines whether or not the first moving object and the second moving object will approach to a predetermined reference distance in a state where detection of the first moving object in the second detection area is interrupted by the obstacle and detection of the second moving object in the first detection area is interrupted by the obstacle (step S104). The determining unit 231 obtains the distance between the first moving object and the second moving object, and compares it with the reference distance. In some embodiments, the reference distance is a distance that allows each of the two moving objects to be stopped safely without collision, when the two moving objects are warned by the vehicle 10. The determining unit 231 is an example of a third determination unit. The processing of the step S104 will be described later with reference to FIG. 5.

When it is determined to the first moving object and the second moving object will approach to the predetermined reference distance (step S104—Yes), the determining unit 233 decides to notify the first moving object and the second moving object of warning (step S105), and the series of processing steps is complete. The deciding unit 233 notifies the first moving object and the second moving object of warning using the warning device 4. The warning may be a loud sound. The warning may also be a voice representing that another vehicle is approaching. Each of the drivers of the vehicle 60 and vehicle 70 who are aware of the warning can manually operate the vehicle to avoid approaching to another moving object. The warning may also be a blinking of the headlights. The deciding unit 233 may also notify the driver of the warning through the UI 7.

The deciding unit 233 may further decide to decelerate, stop, or steer the vehicle 10 away from the two vehicles 60, 70. The deciding unit 233 notifies these controls to the automatic control device 12. The automatic control device 12 carries out the notified controls. This ensures the safety of the vehicle 10 in case the vehicle 60 and vehicle 70 approach each other.

On the other hand, when it is determined that they will not approach to the reference distance (step S104—No), the deciding unit 233 determines whether the collision time (Time to Collision: TTC) is less than a predetermined reference time (step S106). The determining unit 231 acquires the speeds of the first moving object and the second moving object based on the object detection information. The determining unit 231 obtains a collision time until the first moving object and the second moving object collide when they move at the current speed.

When the collision time is less than the reference time (step S106—Yes), the deciding unit 233 determines to notify the first moving object and the second moving object of the warning (step S105), and the series of processing steps is complete.

Further, when it is not determined that a first moving object and second moving object (step S101—No) are present, when it is determined that no obstacle is present (step S103—No), or when the collision time is not less than the reference time (step S106—No), the series of processing steps is complete.

Figure 5:
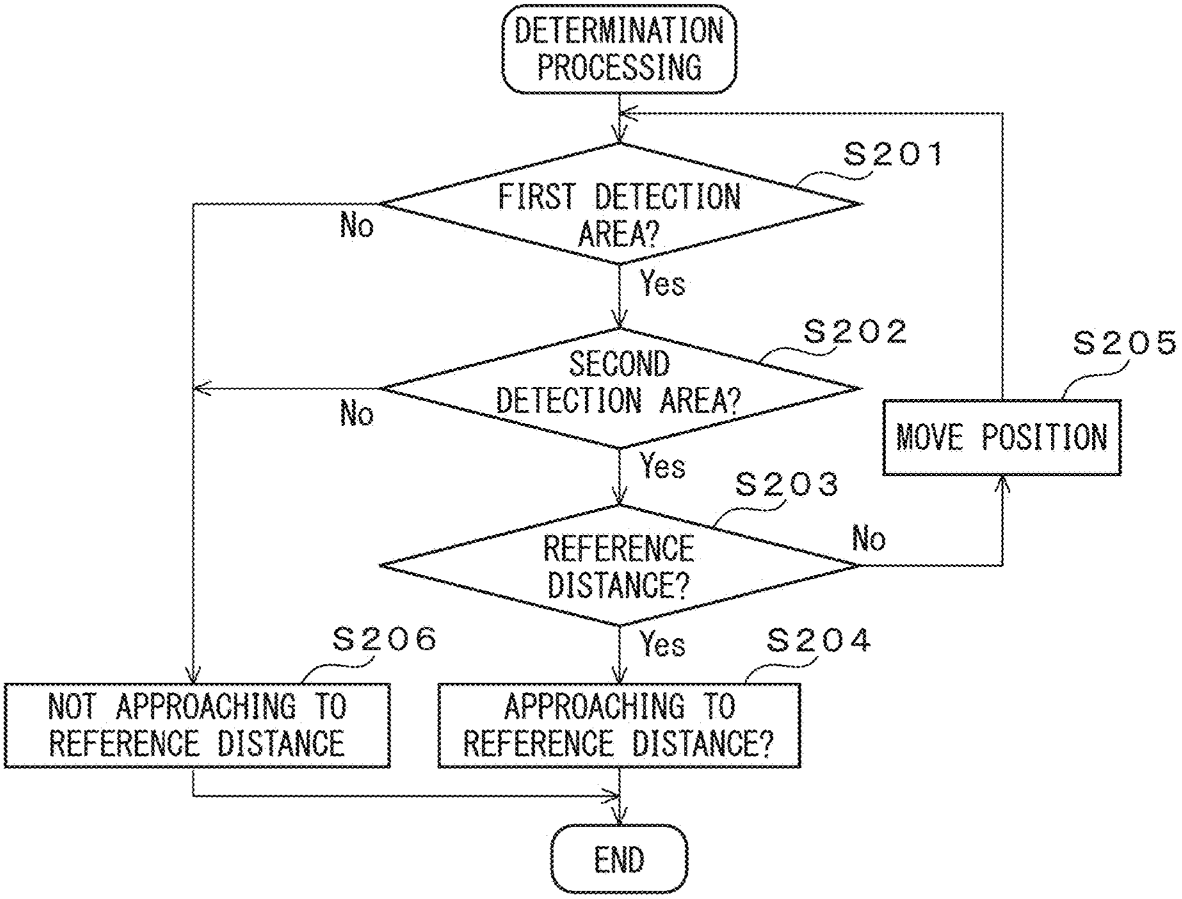
FIG. 5 is an example of an operation flow chart for determination processing by a monitoring device of the present embodiment.

Next, referring to FIG. 5, the determination processing of step S104 described above will be described below. FIG. 5 is an example of an operation flowchart of the determination process of the monitoring device 13 of the present embodiment. FIG. 5 is an example of an operation flow chart for determination processing by the monitoring device 13 of the present embodiment.

First, the determining unit 231 determines whether the detection of the second moving object in the first detection area F1 is interrupted by the obstacle (step S201). The determining unit 231 sets a detection area F1S within the first detection area F1, which is not interrupted by the obstacle.

In the example shown in FIG. 4, the determining unit 231 determines that the area beyond the position where the first detection range F1 overlaps the obstacle 80, outwards from the vehicle 60, is an area where detection is interrupted. The determining unit 231 sets a detection area F1S where detection is not interrupted by the obstacle 80 within the first detection area F1. The detection area F1S is shown as a hatched area.

Then, the determining unit 231 determines whether the detection of the second moving object in the first detection extent F1 is interrupted by the obstacle. When even a part of the second moving object is included in the detection area F1S, the determining unit 231 determines that detection of the second moving object in the first detection area F1 is not interrupted by the obstacle. On the other hand, when the second moving object is not included in the detection area F1S, the determining unit 231 determines that detection of the second moving object in the first detection area F1 is interrupted by the obstacle.

When the detection of the second moving object in the first detection area F1 is interrupted by the obstacle (step S201—Yes), the determining unit 231 determines whether the detection of the first moving object in the second detection area F2 is interrupted by the obstacle (step S202). The determining unit 231 sets a detection area F2S where detection is not interrupted by an obstacle within the second detection area F2.

In the example shown in FIG. 4, the determining unit 231 determines that the area beyond the position where the second detection range F2 overlaps the obstacle 80, outwards from the vehicle 70, is an area where detection is interrupted. The determining unit 231 sets a detection area F2S where detection is not interrupted by the obstacle 80 within the second detection area F2. The detection area F2S is shown as a hatched area.

Then, the determining unit 231 determines whether the detection of the first moving object in the second detection area F2 is interrupted by the obstacle. When even a part of the first moving object is included in the detection area F2S, the determining unit 231 determines that detection of the first moving object in the second detection area F2 is not interrupted by the obstacle. On the other hand, when the first moving object is not included in the detection area F2S, the determining unit 231 determines that detection of the first moving object in the second detection area F2 is interrupted by the obstacle.

When the detection of the first moving object in the second detection area F2 is interrupted by the obstacle (step S202—Yes), the determining unit 231 determines whether the first moving object and the second moving object are approaching to a predetermined reference distance (step S203).

The determining unit 231 may set the reference distance based on the speed of the first moving object and the second moving object. For example, the determining unit 231 sets the reference distance to be longer when the speed of one of the first moving object and second moving object exceeds a predetermined reference speed than when the speed of one of the first moving object and t second moving object does not exceed the reference speed. The reference speed can be, for example, 30 km/h to 50 km/h. In some embodiments, when the speed of the first moving object or the second moving object is relatively high, it is to notify earlier that they are approaching each other.

When the first moving object and second moving object are approaching to the reference distance (step S203—Yes), the determining unit 231 determines that the first moving object and second moving object are approaching to the reference distance (step S204), and the series of processing steps is complete.

On the other hand, when the first moving object and the second moving object are not approaching to the reference distance (step S203—No), the determining unit 231 moves the respective positions of the first moving object and second moving object in the traveling direction (step S205), and returns to the before the step S201. The distance for moving the position of the first moving object is obtained by the product of the speed d of the first moving object and the unit time. Similarly, the distance for moving the position of the second moving object is obtained by the product of the speed of the second moving object and the unit time. The unit time may be, for example, 0.01 to 0.1 seconds. Note that after the step S205, the above-described step S103 processing may be further carried out, when any obstacles are existing the processing returns before the step S201. On the other hand, when there is no obstacle, the monitoring processing ends.

In addition, when the detection of the second moving object in the first detection area F1 is not interrupted by the obstacle (step S201—No) or when the detection of the first moving object in the second detection area F2 is not interrupted by the obstacle (step S202—No), the determining unit 231 determines that the first moving object and the second moving object are not approaching to the reference distance (step S206), and the series of processing steps is complete.

The above-described determination processing may be carried out when the distance between the first moving object and second moving object is closer than a predetermined monitoring distance. For example, the monitoring range can be 50 m to 100 m. This is because it is difficult to understand the meaning of a warning if the first and second moving objects are far apart, even if a warning is given that they are approaching.

As described in detail above, when the monitoring device detects that the two moving objects are approaching each other, the monitoring device can notify the two moving objects that they are approaching each other before they get too close and prevent the two moving objects from approaching each other.

Figure 6:
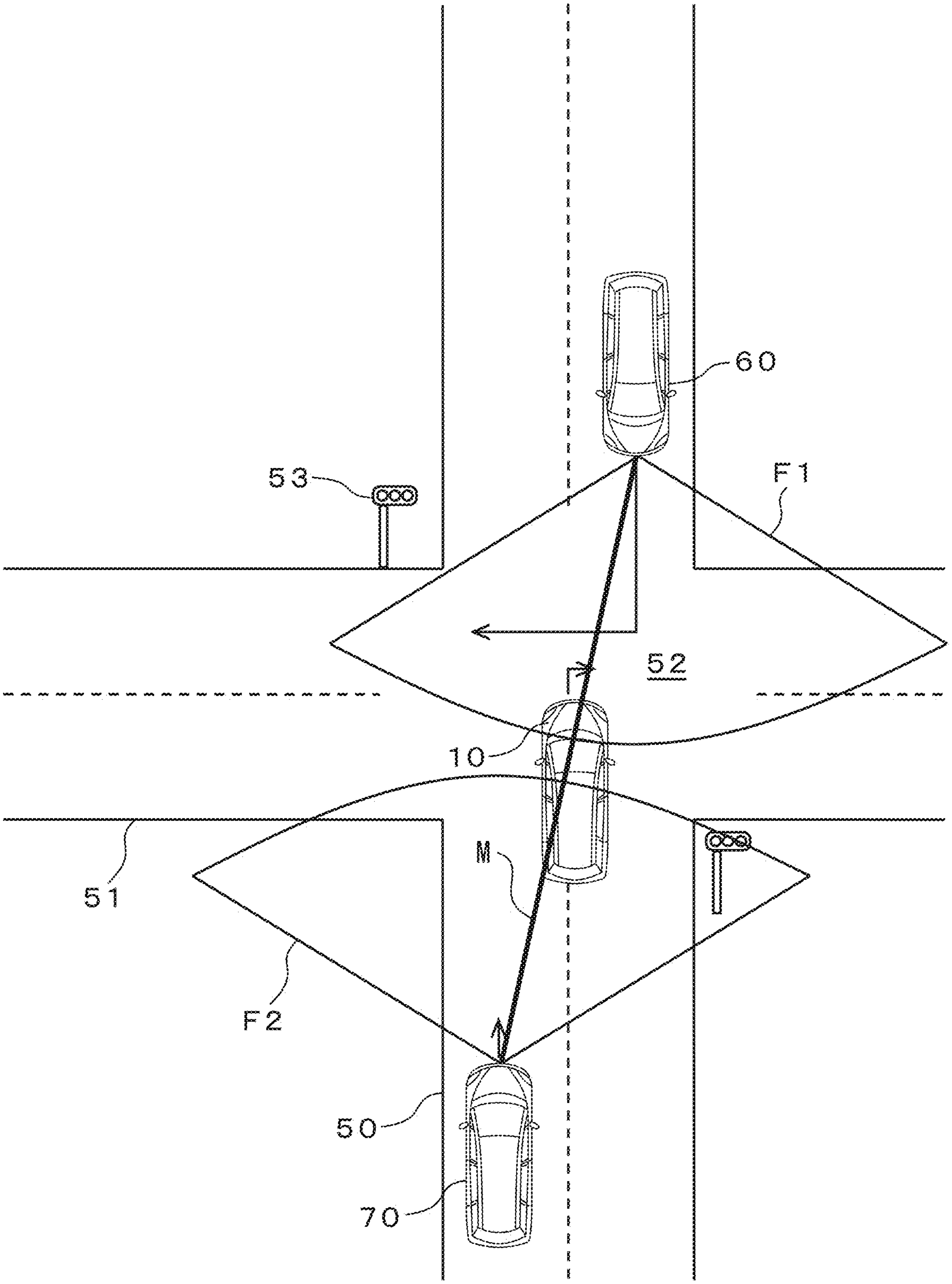
FIG. 6 is another example of an operation flow chart for determination processing by a monitoring device of the present embodiment.

The situation in which the monitoring device 13 of the present embodiment carries out the determination processing is not limited to the example shown in FIG. 1. Another example in which the monitoring device 13 carries out a determination processing will be described below. FIG. 6 is another example of an operation flow chart for determination processing by a monitoring device 13 of the present embodiment. Next, with reference to FIG. 6, another example in which the determination processing is carried out will be described below.

As shown in FIG. 6, the vehicle 10 is traveling on a road 50. The vehicle 10 is parked to turn right at the intersection 52 where the road 50 and road 51 intersect.

The monitoring device 13 determines that there is a vehicle 60 and vehicle 70 in a predetermined area around the vehicle 10 based on the object detection information. The vehicle 60 is traveling on the road 50 on the opposite side of the vehicle 10 with respect to the intersection 52 and will turn right at the intersection 52. The vehicle 70 is traveling on the road 51 and will go straight ahead at the intersection 52.

The monitoring device 13 sets a first detection area F1 for detecting another moving object with respect to the vehicle 60 and sets a second detection area F2 for detecting another moving object with respect to the vehicle 70.

The determining unit 231 determines that there is a vehicle 10 as an obstacle because the straight line M connecting the position of the vehicle 60 and the position of the vehicle 70 intersects the area where the vehicle 10 is located. Since the vehicle 10 is stationary, it can be an obstacle. That is, the determining unit 231 determines that there is the vehicle 10 as an obstacle which may interrupt detection of the second moving object included in the first detection area F1 and may interrupt detection of the first moving object included in the second detection area F2.

The determining unit 231 determines that the vehicle 60 and vehicle 70 approach to a predetermined reference distance while the detection of the vehicle 60 within the second detection area F2 is interrupted by the vehicle 10 and the detection of the vehicle 70 within the first detection area F1 is interrupted by the vehicle 10. The deciding unit 233 decides to notify the vehicle 60 and vehicle 70 of the warning.

The determining unit 231 may set the reference distance based on the positional relationship between the vehicle 60 and vehicle 70, and the vehicle 10. For example, the determining unit 231 sets the reference distance to be shorter when the vehicle 60 and vehicle 70 are on the same side with respect to the vehicle 10 than when the vehicle 60 and vehicle 70 are on different sides with respect to the vehicle 10.

In the example shown in FIG. 1, the vehicle 60 and vehicle 70 are on the same side with respect to the vehicle 10. On the other hand, in the example shown in FIG. 6, the vehicle 60 and vehicle 70 are on different sides with respect to the vehicle 10. Therefore, the reference distance of the example shown in FIG. 6 is set to be longer than the reference distance of the example shown in FIG. 1. In the example shown in FIG. 6, the vehicle 10 is located between vehicle 60 and vehicle 70, so the reference distance is longer by that amount.

The determining unit 231 may set the reference distance based on the state of the traffic light of the intersection 52. There is a traffic light 53 in the travelling direction of the vehicle 70. For example, the determining unit 231 sets the reference distance to be longer when the traffic light 53 is a green light than when the traffic light 53 is a red light. When the traffic light 53 is the green light, the vehicle 70 is traveling at a higher speed and therefore the reference distance is increased to provide an early warning.

Also in the example shown in FIG. 6, the determining unit 231 may set the reference distance based on the speed of the vehicle 60 and vehicle 70.

Further, as a situation in which the monitoring device 13 of the present embodiment carries out the determination processing, there is also the following example. The vehicle 10 is travelling on a road with two opposing lanes and a truck is parked in the lane in front of vehicle 10. From further front of the truck, an oncoming vehicle is traveling toward the vehicle 10. Here, a pedestrian is trying to cross the road in front of the truck.

The monitoring device 13 determines that there is an oncoming vehicle and a pedestrian in a predetermined area around the vehicle 10 based on the object detection information.

The monitoring device 13 virtually arranges a first sensor in the center of the front of the oncoming vehicle, and sets a first detection area with respect to the first sensor. Further, the monitoring device 13 virtually arranges a second sensor in the center in front of the pedestrian and sets a second detection area with respect to the second sensor.

The monitoring system 13 determines that there is a truck as an obstacle because the straight line connecting the position of the oncoming vehicle and the position of the pedestrian intersects the area where the truck is located.

The determining unit 231 determines whether the oncoming vehicle and the pedestrian approach a predetermined reference distance while the detection of the pedestrian within the first detection area F1 is interrupted by the track and the detection of the oncoming vehicle within the second detection area F2 is interrupted by the track. When it is determined that the oncoming vehicle and the pedestrian approach to the reference distance, the deciding unit 233 decides to notify the oncoming vehicle and the pedestrian of the warning.

In the present disclosure, the monitoring device of the above-described embodiment can be appropriately changed without departing from the spirit of the present disclosure. Further, the technical scope of the present disclosure is not limited to those embodiments, but extends to the present disclosure described in the claims and the equivalent thereof.

For example, in the monitoring processing in the above-described embodiment, the determination processing etc. has been carried out when two moving objects are detected. When three or more moving objects are detected, the above-described determination processing, etc. is carried out for two moving objects out of three or more moving objects.

Further, the determination processing in the above-described embodiment is not limited to the above-described method. Other methods may be used to carry out the determination processing.

In the above-described embodiment, the distance between the host vehicle and the moving object, etc. has been obtained using a LiDAR sensor, but the distance between the host vehicle and the moving object, etc. may be measured using a stereo camera. Further, a camera image acquired by a camera may be input to a classifier that has been trained to estimate the distance between the vehicle and the moving object in the image, and to calculate the distance from the vehicle to the moving object, etc.

The invention claimed is:

1. A monitoring device comprising:

a processor configured to determine whether a first moving object and a second moving object are present in a predetermined area around a host vehicle, set a first detection area for detecting another moving object with respect to the first moving object and a second detection area for detecting another moving object with respect to the second moving object, when it has been determined that the first moving object and the second moving object are present, determine whether an obstacle which interrupts detection of the second moving object included in the first detection area and interrupts detection of the first moving object included in the second detection area is present, when the first detection area and the second detection area have been set, determine whether the first moving object and the second moving object will approach to a predetermined reference distance in a state where detection of the second moving object in the first detection area is interrupted by the obstacle and detection of the first moving object in the second detection area is interrupted by the obstacle, when it has been determined that the obstacle is present, decide to notify the first moving object and the second moving object of a warning, when it has been determined that the first moving object and the second moving object will approach to the reference distance, set the reference distance based on a positional relationship of the first moving object and the second moving object with respect to the host vehicle, and set the reference distance to be shorter when the first moving object and the second moving object are on the same side with respect to the host vehicle than when the first moving object and the second moving object are on different sides with respect to the host vehicle.

2. A monitoring device comprising:

a processor configured to determine whether a first moving object and a second moving object are present in a predetermined area around a host vehicle, set a first detection area for detecting another moving object with respect to the first moving object and a second detection area for detecting another moving object with respect to the second moving object, when it has been determined that the first moving object and the second moving object are present, determine whether an obstacle which interrupts detection of the second moving object included in the first detection area and interrupts detection of the first moving object included in the second detection area is present, when the first detection area and the second detection area have been set, determine whether the first moving object and the second moving object will approach to a predetermined reference distance in a state where detection of the second moving object in the first detection area is interrupted by the obstacle and detection of the first moving object in the second detection area is interrupted by the obstacle, when it has been determined that the obstacle is present, decide to notify the first moving object and the second moving object of a warning, when it has been determined that the first moving object and the second moving object will approach to the reference distance, set the reference distance based on speed of the first moving object and the second moving object, and set the reference distance to be longer when the speed of one of the first moving object and the speed of the second moving object exceeds a predetermined reference speed than when the speed of the first moving object and the speed of the second moving object does not exceed the reference speed.

* * * * *